US009644357B2

(12) United States Patent
Bowcutt et al.

(10) Patent No.: US 9,644,357 B2
(45) Date of Patent: May 9, 2017

(54) TOILET OVERFLOW PREVENTION SYSTEM AND METHOD

(71) Applicant: LIMIT, INC., Irvine, CA (US)

(72) Inventors: Kevin Bowcutt, Aliso Viejo, CA (US); Ahmed Shishegar, Woodland Hills, CA (US); Matthew Ibarra, Lakewood, CA (US); Daniel Corbin, Irvine, CA (US); Dennis Repp, Newport Beach, CA (US); Robert M. Connell, Villa Park, CA (US); Oscar Dufau, San Clemente, CA (US); Gregory Blake, Irvine, CA (US); Sam Iravantchi, Fountain Valley, CA (US)

(73) Assignee: LIMIT, INC., Irvine, CA (US)

( * ) Notice: Subject to any disclaimer, the term of this patent is extended or adjusted under 35 U.S.C. 154(b) by 571 days.

(21) Appl. No.: 13/763,473

(22) Filed: Feb. 8, 2013

(65) Prior Publication Data

US 2013/0247291 A1 Sep. 26, 2013

Related U.S. Application Data

(60) Continuation of application No. 13/117,771, filed on May 27, 2011, now Pat. No. 8,370,969, which is a (Continued)

(51) Int. Cl.
  *E03D 5/02* (2006.01)
  *G01F 23/00* (2006.01)
  (Continued)

(52) U.S. Cl.
  CPC .............. *E03D 5/026* (2013.01); *E03D 5/00* (2013.01); *E03D 11/00* (2013.01);
  (Continued)

(58) Field of Classification Search
  CPC .............. E03D 5/00; E03D 11/00; Y10S 4/09
  (Continued)

(56) References Cited

U.S. PATENT DOCUMENTS 1,956,087 A 5/1933 Tracy
2,080,073 A 5/1937 Finley
(Continued)

FOREIGN PATENT DOCUMENTS

EP 798425 A2 * 10/1997 ............. E03D 13/00
JP 10 299066 11/1998
(Continued)

OTHER PUBLICATIONS

PCT International Search Report; PCT/US2007/087482.

*Primary Examiner* — Paul West
(74) *Attorney, Agent, or Firm* — Knobbe, Martens, Olson & Bear, LLP (57) ABSTRACT

A system for preventing overflow of a toilet includes a sensor, a processor and an actuator. The sensor senses a parameter caused by fluid dynamics within the toilet during a flush cycle. The parameter may involve vibration, sound, pressure, fluid flow rate or other detectable characteristics of the toilet. The processor uses information regarding the parameter that is gathered by the sensor to evaluate the condition of the flush cycle to determine if an impeded flush condition exists. In the event of an impeded flush condition, the processor directs the actuator to close a valve, which may be the toilet flapper valve in some embodiments. Also disclosed are methods for preventing toilet overflow, detecting an impeded flush condition and calibrating the system.

9 Claims, 8 Drawing Sheets

Related U.S. Application Data division of application No. 12/641,167, filed on Dec. 17, 2009, now Pat. No. 7,950,265, which is a division of application No. 11/733,616, filed on Apr. 10, 2007, now Pat. No. 7,636,959.

(60) Provisional application No. 60/888,264, filed on Feb. 5, 2007, provisional application No. 60/870,520, filed on Dec. 18, 2006.

(51) Int. Cl.
*E03D 11/00* (2006.01)
*E03D 5/00* (2006.01)

(52) U.S. Cl.
CPC ...... *G01F 23/0007* (2013.01); *G01F 23/0069* (2013.01); *G01F 23/0084* (2013.01); *Y10S 4/09* (2013.01)

(58) Field of Classification Search
USPC .............................. 4/313, 406, 427, DIG. 3
See application file for complete search history.

(56) References Cited

U.S. PATENT DOCUMENTS

| | | | |
|---|---|---|---|
| 2,988,751 A | 6/1961 | Rutherford | |
| RE26,631 E | 7/1969 | Abbott | |
| 3,885,253 A | 5/1975 | Overbey | |
| 4,135,263 A | 1/1979 | Anderson | |
| 4,170,049 A | 10/1979 | Gilliland | |
| 4,240,167 A | 12/1980 | Gilliland | |
| 4,348,778 A | 9/1982 | Rau | |
| 4,402,093 A | 9/1983 | Luker et al. | |
| 4,498,203 A | 2/1985 | Barnum et al. | |
| 4,802,246 A | 2/1989 | Laverty, Jr. | |
| 5,062,166 A | 11/1991 | Krenecki | |
| 5,341,522 A | 8/1994 | Munro | |
| 5,661,855 A * | 9/1997 | Osmond | 4/415 |
| 6,016,577 A | 1/2000 | Cooley | |
| 6,032,303 A | 3/2000 | Schmidt | |
| 6,052,841 A | 4/2000 | Mankin et al. | |
| 6,098,211 A | 8/2000 | Ehrensperger et al. | |
| 6,151,724 A | 11/2000 | Klingenstein | |
| 6,178,569 B1 | 1/2001 | Quintana | |
| 6,671,894 B1 | 1/2004 | Sigrist | |
| 6,802,084 B2 | 10/2004 | Ghertner et al. | |
| 6,934,977 B1 | 8/2005 | Quintana et al. | |
| 7,028,347 B2 | 4/2006 | Sanderson | |
| 7,636,959 B2 | 12/2009 | Bowcutt et al. | |
| 7,950,265 B2 | 5/2011 | Bowcutt et al. | |
| 8,310,369 B1 * | 11/2012 | Canfield et al. | 340/605 |
| 8,370,969 B2 | 2/2013 | Bowcutt et al. | |
| 2003/0154542 A1 | 8/2003 | Goda | |
| 2003/0196258 A1 | 10/2003 | Pham et al. | |
| 2004/0139788 A1* | 7/2004 | Ghertner et al. | 73/40 |
| 2005/0132482 A1 | 6/2005 | Butsch et al. | |
| 2006/0168716 A1* | 8/2006 | Schuster et al. | 4/415 |
| 2007/0157374 A1* | 7/2007 | Morris | 4/427 |
| 2008/0053532 A1 | 3/2008 | Miller et al. | |
| 2011/0035063 A1* | 2/2011 | Palayur | 700/283 |
| 2013/0180040 A1* | 7/2013 | Baumann | 4/415 |

FOREIGN PATENT DOCUMENTS

| | | | | |
|---|---|---|---|---|
| JP | 2006177063 A | * | 7/2006 | ............. E03D 5/10 |
| WO | WO 2006/083507 | | 8/2006 | |

* cited by examiner

TOILET OVERFLOW PREVENTION SYSTEM AND METHOD

RELATED APPLICATIONS

Related applications are listed on an Application Data Sheet (ADS) filed with this application. The entireties of any applications listed on the accompanying ADS are hereby incorporated by reference herein and made a part of this specification.

BACKGROUND OF THE INVENTION

Field of the Invention

The present invention generally relates to toilets. More specifically, the present invention relates to an overflow prevention device for a toilet.

Description of the Related Art

Although significant advances have been made in toilet technology, particularly in reducing the amount of water needed for flushing purposes, a satisfactory solution for preventing the overflow of a toilet in the event of a blockage of the toilet bowl, or associated waste plumbing, has not been achieved. Existing overflow prevention devices, in order to provide acceptable reliability, are often complex and result in the devices having a high cost. Furthermore, existing overflow prevention devices often include visible components, which can result in a displeasing appearance.

SUMMARY OF THE INVENTION

Preferred embodiments of the present invention operate to prevent toilet overflow in a cost-effective and reliable manner. In addition, preferred embodiments may be integrated into a toilet assembly during manufacture or retrofitted into an existing toilet, preferably with little or no modification of the standard toilet. Embodiments intended for retrofitting in existing toilets desirably require a low level of skill to install.

An aspect of the present invention involves a toilet overflow prevention system for use with a toilet, including a sensor capable of detecting vibration of the toilet during a flush cycle. The sensor generates a signal indicative of the vibration. A processor receives the signal from the sensor and processes the signal to determine if the vibration is indicative of an impeded flush condition. If an impeded flush condition is determined to exist, the processor generates a control signal. An actuator receives the control signal from the sensor and in response to the control signal operates to close a valve, which stops a flow of water within the toilet. The valve may be the flapper valve of the toilet that controls a flow of water from the tank to the bowl of the toilet.

Another aspect of the present invention involves a method for preventing toilet overflow, including detecting a vibration of the toilet during a flush cycle and comparing a parameter of the vibration to a normal range of the parameter. The method also includes determining that an impeded flush condition exists if the parameter is outside of the normal range and closing a valve to at least substantially stop a flow of water within the toilet.

Still another aspect of the present invention involves a method of calibrating a system for detecting an impeded flush of a toilet comprising sensing the value of a parameter of one or more normal flush cycles of the toilet and establishing a normal range for the value of the parameter using the sensed value. The method may also include storing the normal range in a memory for comparison to a value of the parameter during subsequent flush cycles. The method may further include the sensing being performed over a predetermined timeframe. The method may still further include the time frame being sufficient to include the entire push cycle of the toilet.

Another aspect of the present invention involves a method of determining the existence of an impeded flow condition of a toilet comprising sensing a value of a parameter of a flush cycle caused by water dynamics within the toilet, comparing the sensed value of the parameter to a normal range of values for the parameter and determining that an impeded flow condition exists if the sensed value is outside of the normal range.

BRIEF DESCRIPTION OF THE DRAWINGS

These and other features, aspects, and advantages of the present invention are described in connection with preferred embodiments of the invention, in reference to the accompanying drawings. The illustrated embodiments, however, are merely exemplary and are not intended to limit the invention. The drawings include the following nine figures.

DETAILED DESCRIPTION OF THE PREFERRED EMBODIMENT

Figure 1:
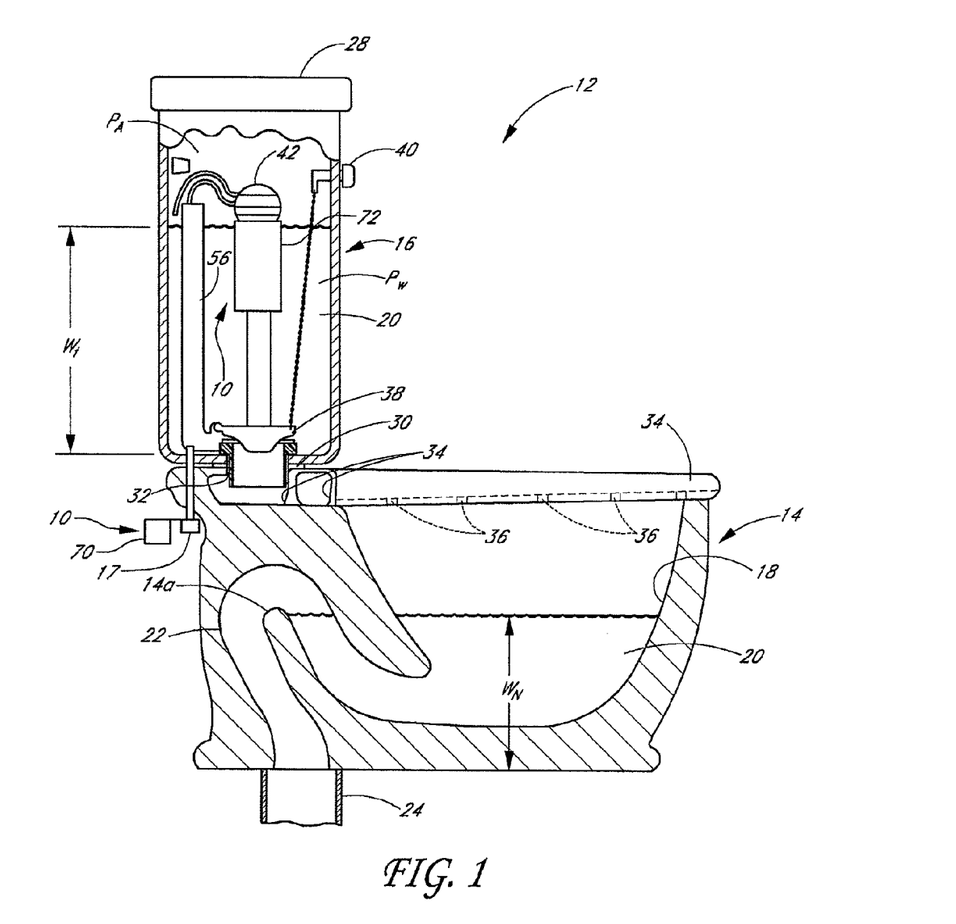
FIG. 1 is a side, partial cross-sectional view of a toilet incorporating an overflow prevention device including certain features, aspects and advantages of the present invention. The toilet generally includes a base, defining a bowl, and a tank supported on the base. An interior of the tank communicates with the bowl through a passage.

FIG. 1 illustrates a preferred embodiment of a toilet overflow prevention system 10 incorporated within a toilet 12. The system 10 detects when waste water is not properly emptying from the toilet, generally referred to herein as an impeded flush condition. The detection of an impeded flush condition advantageously occurs during a flush cycle, such that remedial action can be taken by the system 10 during the same flush cycle. The system 10 is capable of stopping a flow of water within the toilet 12 to prevent an overflow situation in response to the detection of an impeded flush condition. Preferred embodiments of the system 10 detect a measurable characteristic or parameter caused by the effects of fluid dynamics during the flush cycle, such as vibration, sound, fluid flow rate or pressure, and determine if an impeded flush condition exists based on the measured characteristic or parameter.

The toilet 12 preferably is of a conventional configuration and includes a base 14 and a tank 16 supported on the base 14. Although the overflow prevention system 10 is described herein in the context of such a toilet 12 having a base 14 and a tank 16, the system 10 may be adapted for use with toilets having alternative configurations, such as a monolithic construction, as will be appreciated by one of skill in the art in view of the present disclosure.

The base 14 defines a bowl 18, which is configured to hold a volume of water 20. A siphon tube 22 connects the bowl 18 with a wastewater plumbing system 24. The siphon tube 22 extends in an upward direction from a lower portion of the bowl 18 and then curves into a downward direction toward the lower end of the base 14 to meet the wastewater plumbing system 24. Accordingly, the height of the upper curve 14a determines a normal water level $W_N$ within the bowl 18.

Preferably, the tank 16 is of a hollow construction and defines an interior space configured to hold a volume of water 20. The volume of water 20 in the tank 16 preferably defines a normal water level $W_T$. Thus, the interior of the tank 16 is the divided into a water portion $P_W$ and an air portion $P_A$. Preferably, an open upper end of the tank 16 is covered by a lid 28.

Water 20 is evacuated from the tank 16 through an outlet 30 defined within a lower wall of the tank 16. Water 20 that passes through the outlet 30 is delivered to the bowl 18 to initiate a flushing action. For example, in a washout-type toilet, water 20 from the tank 16 is delivered to the bowl 18 through a passage 32 and gallery 34, as shown. The passage 32 extends generally vertically from the tank outlet 30 to the gallery 34. The gallery 34 is oriented in a horizontal plane and, preferably, substantially surrounds the bowl 18 at its upper edge, or rim. Openings 36 permit water 20 to flow from the gallery 34 into the bowl 18. However, it will be appreciated by those of skill in the art that the present system 10 may be used with any type of toilet, including siphon jet-type and blowout-type toilets, for example.

With additional reference to FIG. 1, the toilet 12 includes a primary flush valve, or flapper valve 38. The illustrated flapper valve 38 pivots between a closed position, wherein water 20 within the tank 16 is substantially prevented from flowing through the tank outlet 30, to an open position, wherein the water 20 within the tank 16 is permitted to flow through the tank outlet 30 and into the bowl 18 through the passage 32 and the openings 36 of the gallery 34. The flapper valve 38 is coupled to a handle 40 external to the tank 16, which permits a user to activate flushing of the toilet 12 by utilizing the handle 40 to move the flapper valve 38 to the open position. The flapper valve 38 is configured to close automatically once the water 20 within the tank 16 is reduced to a particular level.

Figure 2:
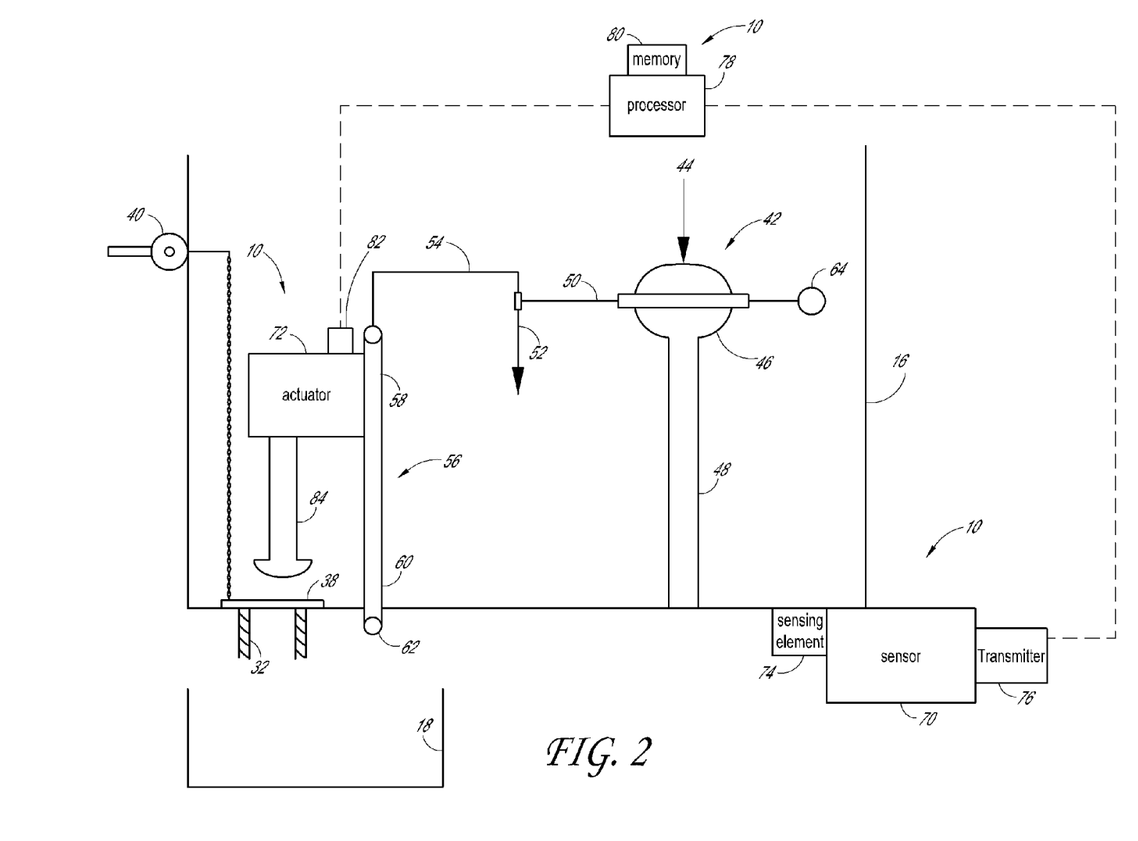
FIG. 2 is a schematic illustration of the toilet and the overflow device of FIG. 1. The illustrated overflow device generally includes a sensor, a processor, and an actuator.

With continued reference to FIG. 1 and FIG. 2, the toilet 12 also includes a tank fill mechanism 42 configured to refill the tank 16 with water 20 from an external water supply source 44 after the tank 16 has been emptied, or the volume of water 20 reduced, during a flush cycle. The tank fill mechanism 42 includes a filler valve 46, which is typically supported at a height above the lower end of the tank 16 by a support structure 48. The filler valve 46 is configured to selectively permit water 20 from the water supply 44 to fill the tank 16 and, typically, the bowl 18.

The filler valve 46 supplies water 20 to the tank 16 and the bowl 18 through a supply line 50. Preferably, the supply line 50 includes a first branch, or tank supply branch 52 and a second branch, or bowl supply branch 54. The tank supply branch 52 supplies water 20 directly into the interior of the tank 16.

The bowl supply branch 54 supplies water 20 to the bowl 18 through an overflow tube 56. The overflow tube 56 includes an open upper end 58 and a lower end 60, which defines a discharge opening 62. The bowl supply branch 54 supplies water 20 to an internal passage of the overflow tube 56 through the upper end 58 and water is discharged through the discharge opening 62.

Preferably, the upper end 58 of the overflow tube 56 is positioned above a normal water level $W_T$ within the tank 16. The discharge opening 62 preferably is positioned below the flapper valve 38 to permit water 20 within the tank to move into the bowl 18 through the overflow tube 56 when the flapper valve 38 is in a closed position. Thus, the overflow tube 56 permits water 20 above a normal water level $W_T$ to bypass the flapper valve 38 in the event that the water level within the tank 16 rises above the upper end 58 of the overflow tube 56, for example, in the event of a malfunction of the filler valve 46. The overflow tube 56 also permits the filler valve 46 to supply water 20 to the bowl 18 through the discharge opening 62 when the flapper valve 38 is in a closed position.

The filler valve 46, in the illustrated arrangement, is controlled by a tank water level sensor in the form of a float 64. Thus, the float 64 establishes the normal water level $W_T$ within the tank 16 by moving the filler valve 46 to a closed position upon reaching a desired water level $W_T$.

With continued reference to FIGS. 1 and 2, the procedure of flushing the toilet 12 generally comprises a flush cycle. The flush cycle can be considered to include a push cycle and a refill cycle. During the flush cycle the contents of the toilet bowl 18 are removed through the siphon tube 22 by water 20 being passed from the tank 16 and entering the bowl 18. In some embodiments, the flush cycle is initiated by actuating the lever 40 that opens the flapper valve 38 thus releasing water from the tank 16 to bowl 18. The initial part of the flush cycle in which the flapper valve 38 has been actuated by the lever 40 and is held open by the buoyancy of the flapper valve 38 and movement of water 20 through the passage 32, is generally referred to as the push cycle. During the push cycle a portion, and usually a substantial amount, of the water 20 in the tank 16 is passed from the tank 16, through the passage 32 and the gallery 34 and into the bowl 18. Thus, during the push cycle a substantial amount of water 20 typically is passed from the tank 16 into the bowl 18. During a normal push cycle, the rapid increase in water level in the bowl 18 preferably creates a siphon effect that removes the contents of the bowl 18 to the wastewater system 24 through the siphon tube 22.

During the flush cycle, the push cycle preferably transitions to a refill cycle in which the flapper valve 38 closes and substantially reduces the flow of water 20 from the tank 16 to bowl 18 through the passage 32. During a refill cycle the tank fill mechanism 42 refills the tank 16 and also refills the bowl 18 via the supply line 50 that includes a branch 54 that feeds water to the overflow tube 56 and subsequently into the bowl 18. Once the water level in the tank 16 has returned to a normal level $W_T$, as shown in FIG. 1, the float 64 shuts off the filler valve 46 to end the refill cycle and thus end the flush cycle.

During the flush cycle, and particularly during the push cycle, the body of the toilet 12 is affected by the fluid dynamics caused by fluid moving within the toilet 12. It has been discovered by the present inventors that the fluid dynamics produce a number of measurable characteristics or parameters that can be used to detect if the flush cycle is normal. That is, by measuring the characteristics or parameters produced by the fluid dynamics during the flush cycle, it is possible to determine if the toilet 12 is in an impeded flush condition or if the toilet 12 is in a normal flush condition.

Generally, an impeded flush is considered as any flush cycle in which a blockage or flow restriction causes a significant reduction in the normal flow of contents from the bowl 18 to the wastewater plumbing system 24. Advantageously, certain embodiments of the present system 10 can be adapted to respond to different levels of restriction to flow by, for example, correlating the level of the sensed characteristic or parameter with the level of the flow restriction. The impedance can comprise content that is clogged within the siphon tube 22 or some kind of backup or clogging in or related to the wastewater plumbing system 24. As will be appreciated by one skilled in the art, an impeded flow can be caused by a wide variety of factors all of which cannot be predicted.

In some embodiments, a normal flush is generally considered a flush cycle in which the contents of the bowl 18 can relatively freely flow out of the bowl 18 through the siphon tube 22 and into the wastewater plumbing system 24 without substantial blockage or reduction of flow. Typically, under normal flush conditions, repeated flush cycles will not cause the water level in the bowl 18 to rise above, or remain above, the normal water level.

With continued reference to FIG. 1 and FIG. 2, one embodiment of a toilet overflow prevention system 10 includes a sensor 70 that is configured to sense a parameter of the flush cycle. The sensor 70 is in communication with an actuator 72 that is capable of initiating or implementing a substantial or total reduction in the amount of water 20 that can flow to the bowl 18 of the toilet 12. In some embodiments, the sensor 70 sends a control signal to a processor 78 to be processed by the processor 78, which then transmits a control signal to the actuator 72. The processor 78 includes a suitable algorithm that is configured to determine if the signal is indicative of certain flow conditions and also can include algorithms that decide if action should be taken in response to the signals. The processor 78 can also include various algorithms for calibrating the toilet overflow prevention system 10, which will be discussed in greater detail below.

The sensor 70, the processor 78 and the actuator 72 may be in communication with one another by various different means. Such suitable means may include a hardwired cable or a wireless signal, such as an RF signal or an acoustic signal. Other suitable methods for communication between the sensor 70, actuator 72 and processor 78, as well as any other components of the system 10, may also be employed. Although illustrated as separate components in FIGS. 1 and 2, the sensor 70 and actuator 72 could be part of an integrated assembly, in which communication between the sensor 70 and actuator 72 could be integrated such that a separate wired or wireless communication link is not necessary. Accordingly, as discussed further below, the sensor 70 is not limited to the location (e.g., outside of the tank 16) shown in FIGS. 1 and 2, but may be positioned in any suitable location in which the desired flush characteristic or parameter may be adequately sensed. Thus, in some arrangements of the system 10, the sensor 70 may be positioned within the tank 16.

The sensor 70 preferably includes necessary components to sense a desired parameter, create a signal indicative of the parameter that can be communicated to other portions of the system 10. The illustrated sensor 70 includes a sensing element 74 that is configured to detect a desired parameter of a flush cycle of the toilet 12. The sensing element 74 may be any suitable type of transducer that is capable of converting a physical measurement into an electronic signal. Such a suitable transducer can comprise vibrating elements (e.g., accelerometers), optical measurement elements, deflecting elements, capacitive, inductive, electromagnetic, strain gauge, piezoelectric, acoustical elements, etc., as will be appreciated by those of skill in the art. In some embodiments, the sensor 70 may include or communicate with a transmitter 76 that is configured to transmit a signal to a processor 78, or another portion of the system 10. In some embodiments, the sensing element 74 and/or transmitter 76 may be separate components from the sensor 70 or may be integrated with the sensor 70. Also, as will be appreciated by one skilled in the art, in certain configurations of the toilet overflow prevention system 10, the transmitter 76 may not be required.

In some embodiments, the system 10 or processor 78 may include a memory 80 for storing certain protocols or parameters that may be used in the processing of signals from the sensor 70. The protocols or parameters may be preprogrammed or they may be established during a calibration process that is described in greater detail below.

The toilet overflow prevention system 10 also preferably includes an actuator 72 that, in some embodiments, may comprise a receiver 82 that is configured to receive a signal from the sensor 70 that has been processed by the processor 78. The actuator 72 may also comprise an electromechanical device 84 that, in some embodiments, is arranged to close the flapper valve 38 of the toilet 12. One exemplary embodiment of the actuator 72 is discussed in greater detail below with reference to FIG. 7 and FIG. 8.

As discussed above, the sensor 70 can comprise various different types of sensors to detect various parameters of a flush cycle of the toilet 12. Moreover, it may be desirable to utilize multiple sensors to provide additional information to the system 10, such as a confirmation of an impeded flush condition to reduce the possibility of a false determination of an impeded condition, which could possibly occur in certain circumstances using only a single sensor or single sensor type. In one embodiment, the sensor 70 detects vibrations of the toilet 12 during a flush cycle. Such a detection of vibrations may comprise directly detecting vibrations of the toilet 12 or indirectly detecting vibrations of the toilet 12. On example of indirect detection of toilet vibration is to detect acoustical vibrations that are produced by the toilet 12 during a flush cycle. One example of direct detection can comprise detecting the physical displacement of the toilet 12 during a flush cycle, such as with accelerometers, strain gages, or other suitable sensors.

In one embodiment, the sensor 70 is an accelerometer that contacts the toilet 12. In one preferred arrangement, the sensor 70 is coupled to the bolt 17 connecting the tank 16 to the bowl 18 as shown in FIG. 1. Such a placement is suitable for detecting vibrations and is also relatively inconspicuous. However, other suitable placements of the sensor 70 are also possible, such as when the system 10 is used with a monolithic toilet model in which the bowl and tank are formed as a single piece.

During the push cycle of a flush cycle, when the flapper valve 38 is open and water is permitted to move from the tank 16 to the bowl 18 through the passage 32, there are detectable parameters that can indicate an impeded flush. For example, if the siphon tube 22 were to have some type of the impedance wherein the water 20 could not flow out of the bowl 18, when the water 20 begins to pass from the tank 16 to the bowl 18, the water 20 in the bowl 18 will begin to rise thus providing a larger than normal amount of water 20 in the bowl 18. In addition, the water 20 may flow at a slower rate than normal from the tank 16 to the bowl 18, thus resulting in a slower rate of change of the water level in the tank 16, which could be measured. Similarly, the rate of change of the pressure within the tank 16, or pressure differentials within the toilet 12 (e.g., between the tank 16 and the bowl 18), may vary in an impeded flush condition from the values typical of a normal flush condition. These differences as compared to a normal flush cycle have been discovered by the present inventors to affect certain parameters or characteristics of the toilet 12, including the vibrational characteristics of the toilet 12. In such circumstances, the amplitude of the vibration of the toilet 12 is decreased, possibly due to the increased amount of water 20 in the bowl 18, the decreased flow rate of the water from the tank 16 to the bowl 18, among other possibilities. It is possible that the decrease in amplitude is, in part, due to the damping effect of the larger-than-normal volume of water 20 in the bowl 18 in the event of an impeded condition. The above-described example is with reference to an accelerometer that can measure amplitude of vibration. As will be appreciated by one skilled in the art, other parameters that can be detected may include frequency or other vibrational parameters that may be measured in the frequency and/or time domains. Such alternative parameters can also be used to determine if an impeded flush condition exists.

Figure 3A:
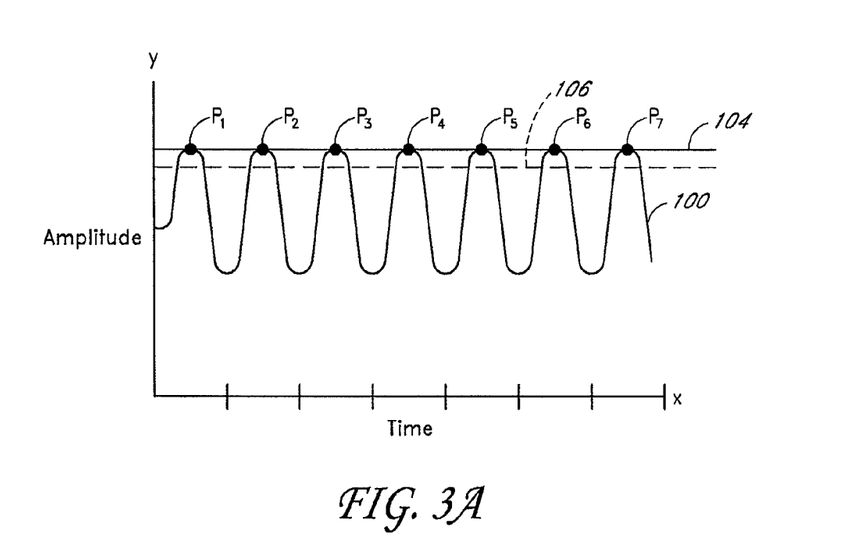
FIG. 3A is a representation of a sensor output as a function of time in the event of a normal flush condition.
Figure 3B:
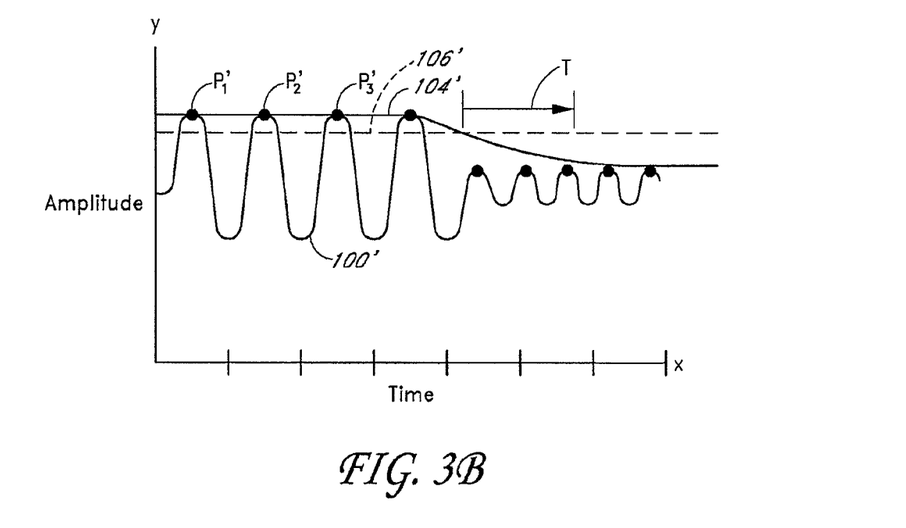
FIG. 3B is a representation of a sensor output as a function of time in the event of an impeded flush condition.

One example of a vibrational signal 100 that is produced by a sensor, such as the sensor 70, during a flush cycle is illustrated in FIG. 3A and FIG. 3B. The vibrational signal 100 shown in FIG. 3A and FIG. 3B is an amplitude versus time plot wherein the amplitude of the vibrational signal 100 oscillates over a period of time. In the particular illustrated embodiment, the time period over which the vibrational signal 100 is displayed is approximately 8 seconds, which is a sufficient period of time to capture a typical push cycle portion of a toilet flush cycle. Experimentation has shown that a typical push cycle is about 6 seconds for toilets that are currently available for consumer use. However, it will be understood that the push cycle time may be considerably longer, depending on the toilet type, especially older toilets that use, for example, 3-5 gallons of water per flush. Although such toilets are not currently produced, at least in significant volumes in the United States, the present system 10 may be used with, or adapted for use with, such toilets. Thus, the illustrated vibrational signal 100 is an example of the typical vibrational signal over the entirety of the push cycle of a flush cycle for toilets that have a push cycle of less than about 8 seconds. However, the system 10 may also be adapted for a desired time interval to correspond to a desired sensing duration. Accordingly, the system 10 can be adapted for the timing of a particular flush cycle. For example, because it is possible to accurately determine the existence of an impeded flush condition in significantly less time than a complete push cycle, some embodiments of the system or method may utilize only a portion of the push cycle.

FIG. 3A illustrates a normal push cycle wherein the vibrational signal 100, at least during a push cycle, maintains substantially the same amplitude at each vibrational peak, or for each period. FIG. 3B illustrates a vibrational signal 100 of an impeded flush condition in which the peak amplitude of the vibrational signal 100 decreases over time. The graphs of FIGS. 3A and 3B illustrate that, during a push cycle, the peak amplitude is a parameter of the vibration of the toilet 12 that is capable of being monitored to distinguish between an impeded flush and a normal flush. Thus, the vibrational signal 100 can be used to determine if the actuator 72 should be actuated in response to any particular flush cycle. In light of the present disclosure, it is apparent that multiple parameters may be satisfactory for use in distinguishing between a normal flush condition and an impeded flush condition in addition to the peak amplitude of the vibrational signal 100 specifically illustrated in FIGS. 3A and 3B. Some of the other possible determination criteria are discussed in greater detail below.

In another embodiment the sensor 70 can comprise an acoustic sensor that, in some embodiments, may be placed on or adjacent to the toilet 12. As will be appreciated by one skilled in the art, the vibrations that can be detected by an accelerometer will, in some embodiments, also create an acoustic signal that can be measured with a transducer, such as a microphone, much like the accelerometer measures vibration of the toilet 12. Once again, in some embodiments, amplitude of the acoustic signal can be measured to determine if an impeded flow condition exists. Detecting acoustical vibrations can be particularly advantageous in that the sensor 70 can be placed in various different locations that are in audible communication with the toilet 12. This can provide a wider range of sensing positions as compared to the vibrational sensing described above with reference to a vibration sensor, such as an accelerometer.

In another embodiment, the sensor 70 can comprise a flow rate sensor that can measure certain flow parameters in the toilet 12 during a flush cycle. One example of a flow rate sensor that can be used to determine a parameter of a flush cycle is a flow rate sensor that monitors flow through the siphon tube 22 of the toilet 12. For example, if there is a blockage in the siphon tube 22, the flow rate of fluid within the toilet 12, such as the flow rate through the siphon tube 22 or through the passage 32 between the tank 16 and the bowl 18, is measurably reduced in most toilets, thus indicating an impeded flow condition. Similar to the vibrational sensing method described above, the flow rate can be measured during a push cycle so that there is sufficient time to close the flapper valve 38 and stop the push cycle prior to contents overflowing from the bowl 18.

In a similar variation of the system 10, an impeded flush condition may be determined by measuring and analyzing a water level within the toilet 12 and, in one arrangement, a change in the level of the water 20 in the tank 12 over time. In other words, the rate of the level change of the water 20 in the tank 12 (e.g. water level drop) can be measured and the measured values used to determine if an impeded flush condition exists. It is expected that the rate of water level change within the tank 12 will be slower than normal if an impeded flush condition exists. The rate of change of the water level may be measured by any suitable sensor, such as a mechanical sensor (e.g. float), for example. Other types of sensors may be used as well. Such an arrangement has an advantage that the water level rate of change may be more practical to measure than the water flow rate (described above) or pressure (described below).

In another embodiment, the sensor 70 can comprise a pressure sensor that, similar to the sensor embodiments described above, can measure certain parameters of a flush cycle that may be indicative of an impeded flush condition. One example of a usage of a pressure sensor is to place a pressure sensor within the toilet 12, such as in the tank 16, bowl 18 or passage 32 therebetween, to measure a pressure characteristic of a fluid within the toilet 12 (e.g., water 20 or air). In such a configuration, in an impeded condition, the water 20 in the tank 16 may drain at a slower rate than that of a normal flush, thus crating a greater head pressure for a longer period of time in the tank 16. As will be appreciated by one skilled in the art, a pressure sensor can be used in a variety of different capacities to detect an impeded flush. For example, it may be desirable to measure pressure differentials at two locations within the toilet 12, and base the decision-making of the system 10 on a pressure differential, rather than on an absolute pressure value.

As discussed briefly above, the sensor 70, in many of its possible embodiments, can be used to detect a parameter of a flush cycle that is indicative of an impeded flush. In some embodiments, the determination of whether the detected parameter is indicative of an impeded flush or a normal flush is achieved by the processing of information gathered by the sensor 70. For example, the signal produced by the sensor 70 may be processed by the processor 78 utilizing one or more algorithms that compare the sensed value of a parameter, or parameters, to the known or expected value of the parameter(s) that are known to be indicative of an impeded flush and/or known to be indicative of a normal flush. That is, the data gathered by the sensor 70 preferably is used to determine if the flush cycle is impeded. FIG. 3A and FIG. 3B illustrate how, in one embodiment, the condition of the flush cycle can be determined as a result of sensed vibrations of the toilet 12.

As discussed above, FIG. 3A is a representation of a vibrational signal 100 from the sensor 70. The vibrational signal 100 is plotted on an amplitude versus time plot such that time is plotted on the x-axis and the amplitude of the vibration is plotted on the y-axis. Also plotted in FIG. 3A are an average peak value 104 and a threshold value 106. In the illustrated embodiment, the average peak value 104 is an average line of the peak values P1-P7 of the vibrational signal 100. The threshold value 106 is an established value that can be compared to the average peak value 104 such that when the average peak value 104 drops below the threshold value 106 an impeded flush is determined to be present. The threshold value 106 can be established through various methods including through experimentation or through a calibration procedure, which is described in greater detail below.

FIG. 3A illustrates a normal flush in which the average peak value 104 does not drop below the threshold value 106 during the particular time interval of interest, which in some arrangements may include the entire push cycle. In contrast, FIG. 3B illustrates an impeded flush in which the average peak value 104' drops below the threshold value 106' in the plotted time interval. Thus, as shown in FIG. 3B the vibrational signal 100' comprises peak values P1'-P7' in which the latter peak values P5'-P7' are below the threshold value 106'. That is, the average peak value 104' that establishes a trend line for the peak values P1'-P7' drops below the threshold value 106' thus indicating that an impeded flush condition exists. In other arrangements, the system 10 may look only at the individual peak values, rather than an average of the peak values and determine that an impeded condition exists if any of the peak values drops below the threshold value 106'.

Although the vibrational signal 100 and 100' illustrated on FIGS. 3A and 3B is illustrated showing peak values P1-P7 and P1'-P7', it will be appreciated by one skilled in the art, that various numbers of peak vales may exist for different vibrational signals. The illustrated vibrational signals 100 and 100' are simply examples and are not intended to limit the scope of the present invention. Furthermore, due to the variation of water dynamics in a toilet during different flush cycles, it is possible that no two vibrational signals will be identical, although it has been determined by the present inventors that the vibrational signals for a particular toilet are consistent enough to permit the accurate distinction between a normal and impeded flush condition.

With continued reference to FIG. 3A and FIG. 3B, the time interval shown in the plots, in some embodiments, can be predetermined so as to capture an appropriate timeframe to measure the vibrational signal of a push cycle of a flush cycle. In the particular illustrated embodiment, the timeframe is approximately 8 seconds, which generally can encompass an entire push cycle of a flush cycle. In many toilets, a push cycle will take approximately 6 seconds, thus a timeframe of eight seconds, in many embodiments, is sufficient to view the entire push cycle. As will be appreciated by one skilled in the art, other timeframes or time windows may be used, as described above, particularly in connection with toilets that have a push cycle time significantly longer than about 6 seconds.

Although the particular illustrated vibrational output shown in FIG. 3A has been illustrated wherein each of the peaks P1-P7 have been illustrated as being above the threshold value 106, in other embodiments, some of the peak values of the vibrational signal 100 may fall below a threshold value 106 but may not indicate an impeded flush. That is, in some impeded flush determination methods, the peak values P1-P7 of the vibrational signal 100 may be allowed to fall below the threshold value 106 for a certain period of time. This can be achieved by an algorithm that determines how many peak values have fallen below a threshold value in a certain amount of time. This can be particularly advantageous when a vibrational signal may produce some sporadic or outlying peaks that may fall below a threshold value but may not necessarily indicate an impeded flush condition. Thus, by providing a time constraint that requires the peak values P1-P7 (or average of the peak values 104 and 104') to fall below the threshold value 106 for a certain amount of time (e.g., the period T in FIG. 3B), the likelihood of an incorrect determination of an impeded flush condition may be reduced. In other words, an algorithm may be used that requires the peak values P1-P7 to drop below the threshold vale 106 for a particular period of time T before an impeded flush is determined to be present. Other arrangements may determine that an impeded condition exists if a particular number of consecutive peak values fall below the threshold value 106. Other possibilities for determining that an impeded condition exists from a sensed signal will be apparent to those of skill in the art in view of the present disclosure.

Although the illustrated example of FIGS. 3A and 3B involves determining the existence of an impeded flush condition by analyzing peak values of a sensed vibration in comparison with a minimum threshold value, other algorithms may be used to analyze the sensed vibration and, more particularly, the output signal of the sensor 70. These algorithms may also be applied to any other sensed parameter or sensor output signal, regardless of type. For example, a frequency domain-type algorithm may be used to analyze the sensor output including, without limitation, an FFT (Fast Fourier Transform), DCT (Discrete Cosine Transform), an others. Time domain-type algorithms may be used, including, without limitation, integral (e.g., integration of a real time signal), derivative (rate of change), running window, envelope detectors, various types of filters (e.g., low, band or high pass), adaptive filters, etc. Moreover, combinations of time and frequency domain processing may be used, as taught by modern digital signal processing methodologies, as will be apparent to those of skill in the art.

In some embodiments, the toilet overflow prevention system 10 can be calibrated for a particular toilet on which it has been installed. This calibration can establish a threshold value that can be substantially similar to the threshold value 106 and 106' described above, to be used to determine the condition of a flush cycle. In the illustrated embodiment, the toilet overflow prevention system 10 can be calibrated on a particular toilet such as the toilet 12 of FIG. 1 with one or more known normal flush cycles that can establish the threshold value 106 or 106' to which future flush cycles can be compared.

In one embodiment, after the toilet overflow prevention system 10 has been installed on a particular toilet, one method to calibrate the system 10 can comprise the user activating a calibration mode of the toilet overflow prevention system 10 such that the system 10 is alerted that the flush or flushes that are soon to follow are calibration flushes. One arrangement enters a calibration mode immediately upon first being turned on. During the calibration, a user preferably activates one or more flushes that are known normal flushes. For example, the user preferably visually verifies that the calibration flushes are normal, or unimpeded. That is, the user can simply flush the toilet at a time when it is known that no impedance will occur. During the normal flushes, the processor 78 receives the output of the sensor 70 that, in some embodiments, may produce an output similar to the signal 100 shown in FIG. 3A. In one embodiment, an algorithm can be applied such that a threshold value or range is determined from the peaks P1-P7. That is, an algorithm can be used to establish the threshold value 106 from the peak values P1-P7 such that the threshold value 106 is set at a predetermined or calculated amount below the peak values P1-P7. After the establishment of the threshold value 106, the threshold value 106 can be stored in a non-volatile memory (e.g., memory 80) and used to compare to future flush cycles to detect an impeded flush condition.

As will be appreciated by one skilled in the art, various different algorithms can be used to establish or calculate a threshold value that then distinguishes between a normal and an impeded flush for a particular parameter. As noted above, certain other conditions may be required to be present in order to determine that an impeded flush condition exists, such as the values being below (or above) the threshold value for a period of time or for a certain number of consecutive values. In addition to the algorithm described above, an alternate algorithm may produce a range or envelope, having upper and lower limits, about a certain measured parameter so as to establish a normal operating range that can be compared to future flushes to determine if an impeded flush condition exists.

One particular advantage provided by calibrating the overflow prevention system 10 after it has been installed on a particular toilet is that many of the operating parameters, including acoustic and vibrational signatures produced by a particular toilet, may be sensitive to the surrounding environmental conditions. For example, a toilet installed on a concrete floor may produce a different vibrational signature than a toilet installed on a wood floor. Also, for example, a toilet installed in a large spacious room may have a different acoustic signature than a toilet installed in a small room or water closet. Thus, calibrating the toilet overflow prevention system 10 after it has been installed in its operational location can provide a more accurate baseline for determining if a flush cycle is impeded.

As discussed above, however, the calibration of the toilet overflow prevention device can also be performed prior to installation. In some embodiments, tests can be performed to establish a set of predetermined ranges or values for a particular toilet or style of toilet such that the calibration procedure described above is not required. For example, if a group of toilets is to be installed under similar operating conditions, the range of threshold values to determine if a flush cycle is impeded can be predetermined and preprogrammed so that the toilet overflow prevention devices need not be calibrated after installation. Such a system may be pre-installed as a part of the original toilet, for example.

Figure 4:
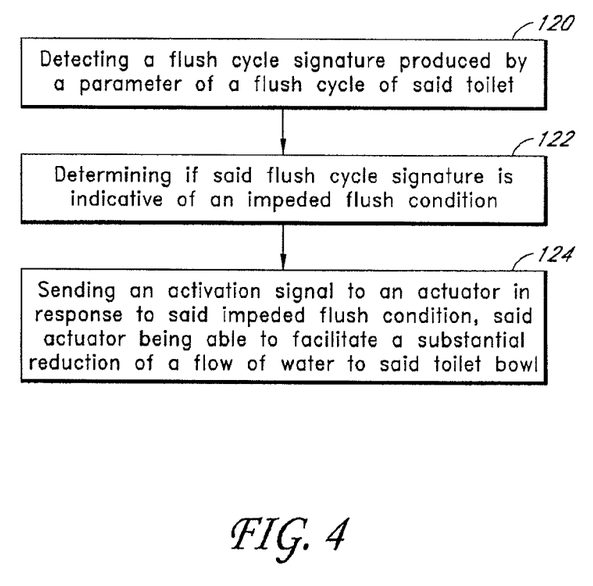
FIG. 4 is a flow chart of a control method for a toilet overflow prevention system.
Figure 5:
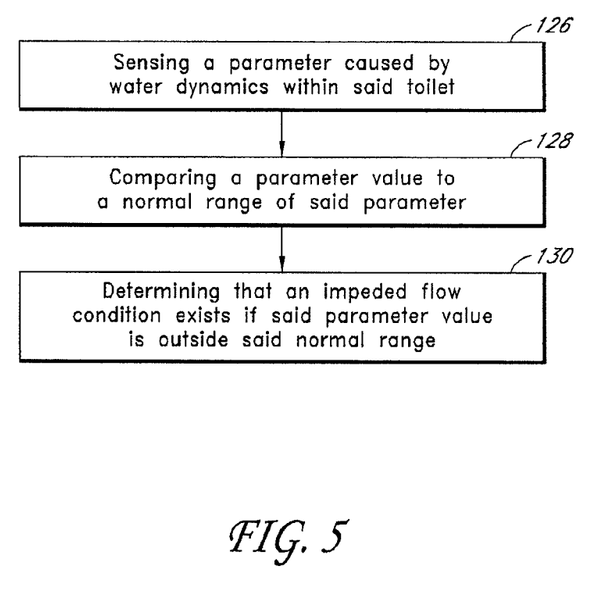
FIG. 5 is a flow chart of a control method for determining if an impeded flow condition is present in the bowl of a toilet.
Figure 6:
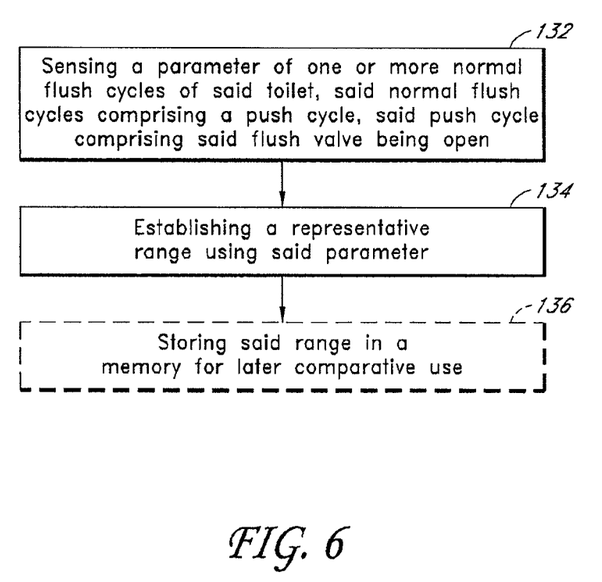
FIG. 6 is a flow chart of a toilet overflow prevention device calibration method.

FIGS. 4-6 are flow diagrams that illustrate preferred control methods that may be employed with some of the foregoing embodiments. In FIG. 4, a control method is provided for toilet overflow prevention. At block 120, a flush cycle signature is detected that is produced by a parameter of a flush cycle of a toilet. As described above, this can be achieved in a variety of different ways including sensing vibration, an acoustic signal, a flow rate, flow level, or a pressure condition. At block 122 the flush cycle signature is determined to be indicative of an impeded flush condition. As described above, this determination can be achieved by an algorithm that, in some embodiment, may be executed in a processor such as the processor 78 of FIG. 2. At block 124, an activation signal is sent to an actuator in response to the impeded flush condition, wherein the actuator is able to implement or initiate a substantial reduction of flow of water to the toilet bowl. As described above, the actuator 72 is configured to receive a signal in response to a detected impeded flush condition. As is discussed in greater detail below, one embodiment of such an actuator is described with reference to FIG. 7 and FIG. 8.

FIG. 5 illustrates a method for determining that an impeded flow condition is present. At block 126, a parameter that is caused by water dynamics within the toilet is sensed. As described above, the parameter can be sensed in a variety of different ways including sensing vibration, an acoustic signal, a flow rate, or a pressure condition. The water dynamics produce detectable parameters that can be analyzed to determine the existence of an impeded flow condition. At block 128, a parameter value of the water dynamics is compared to a normal range of the parameter value. As described above, the normal range can be determined through a variety of different ways, including through characteristics of the toilet or through a calibration procedure. At block 130, it is determined that an impeded flow condition exists if the parameter value is outside the normal range. As described above, the determination can be performed by an algorithm in the processor 78.

In FIG. 6, a preferred method for calibrating a toilet overflow prevention device is illustrated. At block 132, a parameter is sensed for one or more known flush cycles of the toilet, wherein the normal flush cycle includes a push cycle. At block 134, a representative range is established using the parameter that was sensed at block 132. At block 136, the range is stored in the memory for later comparative use.

Figure 7:
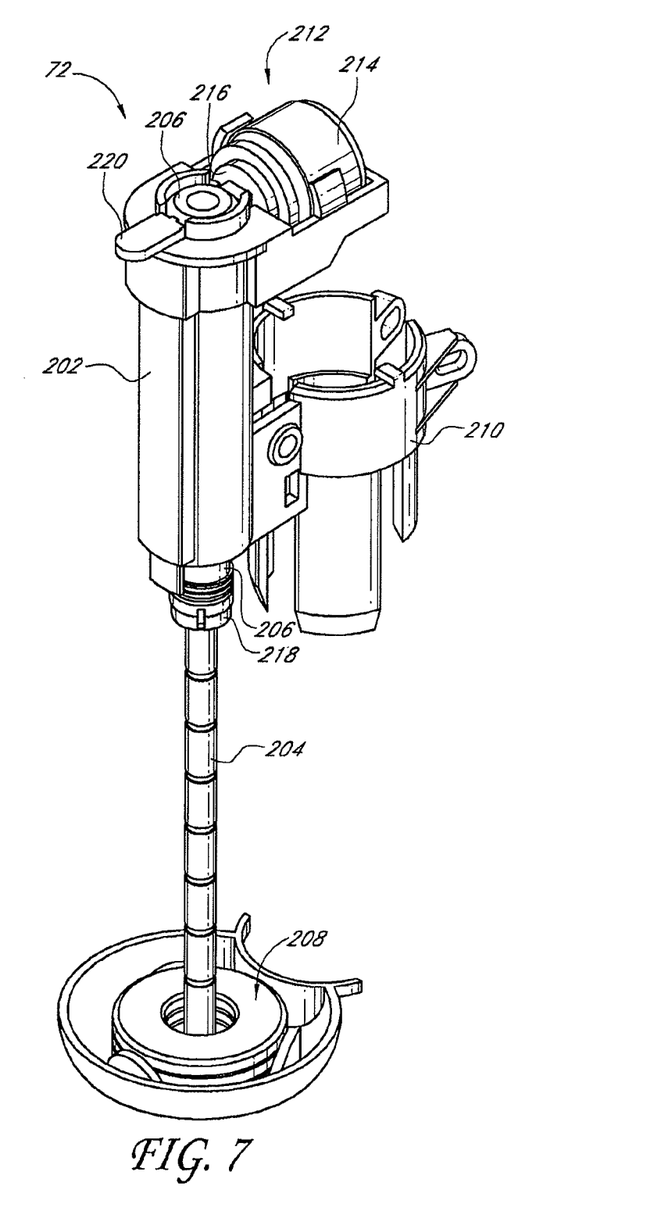
FIG. 7 is a perspective view of an embodiment of an actuator of the toilet overflow prevention device of FIG. 1 and FIG. 2. The actuator of FIG. 7 is configured to shut the flapper valve of a toilet in response to an appropriate control signal.
Figure 8:
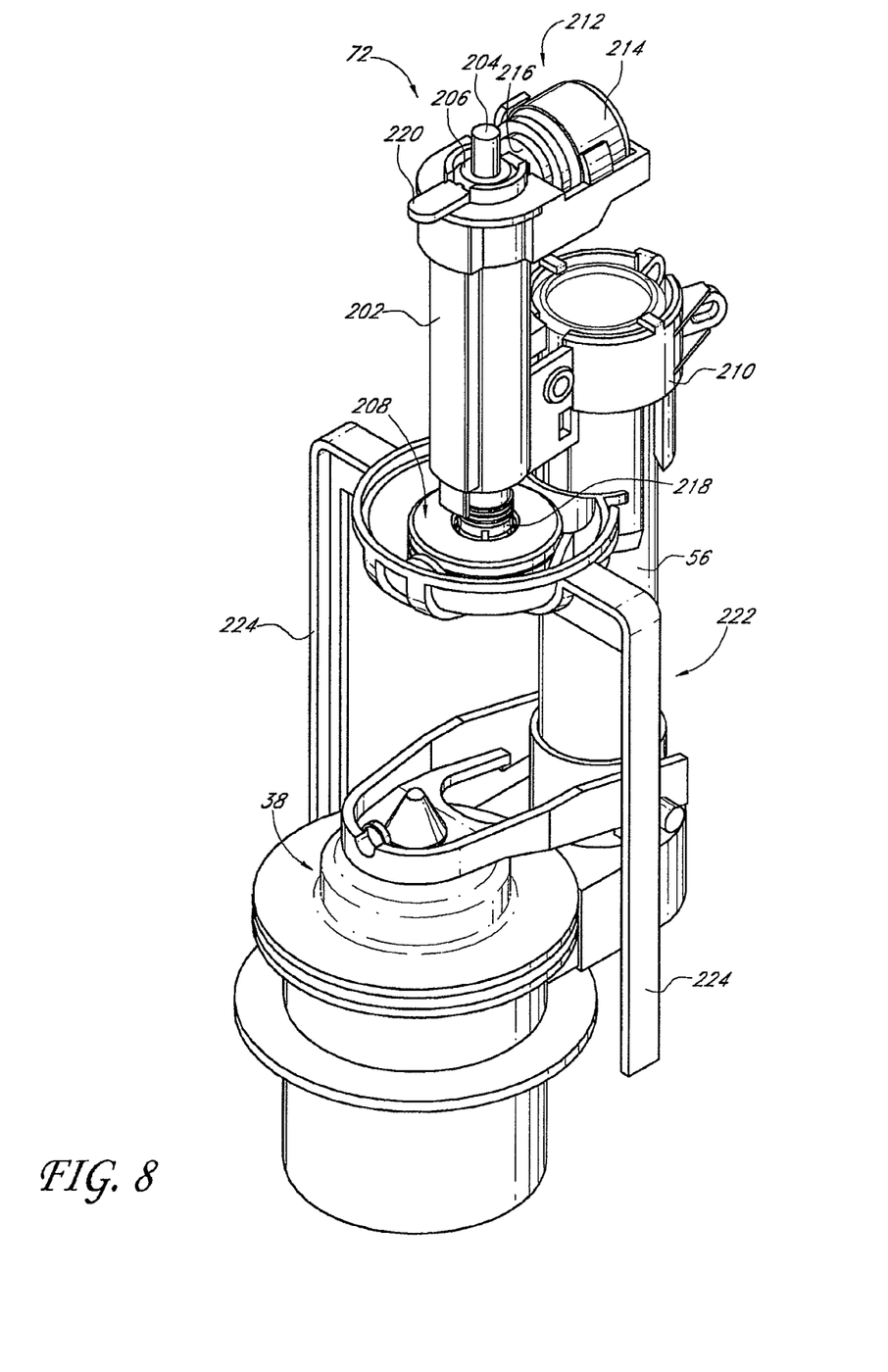
FIG. 8 is a perspective view of the actuator of FIG. 7 attached to a toilet overflow tube.

FIG. 7 and FIG. 8 illustrate one embodiment of the actuator 72. The actuator 72 is generally configured to be attachable to an overflow tube such as the overflow tube 56 illustrated in FIG. 1. The actuator 72 preferably is capable of receiving a signal, which is at least in part generated by the sensor 70 and which may be processed by the processor 78. The actuator is generally configured to forcibly close the flapper valve 38 so as to inhibit or entirely stop the flow of water through the passage 32 from the tank 16 to the bowl 18. In the particular embodiment illustrated in FIG. 7 and FIG. 8, the actuator 72 is configured to push down the flapper valve 38 via a weight dropping mechanism, which is discussed in greater detail below.

The actuator 72 includes a main housing 202 that preferably is a generally tubular member that houses, at least in part, an inner hammer rod 204 and an outer hammer rod 206. the inner hammer rod 204 and the outer hammer rod 206 are configured to be axially movable within the main housing 202. The inner hammer rod 204 carries a hammer weight 208 that is attached to the lower end of the inner hammer rod 204. The main housing 202 also includes an overflow tube attachment structure 210 that allows the actuator 72 to be secured to the top of the overflow tube 56 so as to position the actuator 72 above the flapper valve 38.

With continued reference to FIG. 7, the upper portion of the main housing 202 preferably includes a solenoid assembly 212 that is configured to selectively restrain or release the outer hammer rod 206, which in turn restrains or releases the hammer weight 208. The solenoid assembly 212, in some embodiments, comprises a solenoid 214 that is connected to a solenoid latch 216 that defines a mechanical catch to hold or release the outer hammer rod 206. As discussed briefly above, the solenoid 214 can be actuated by a control signal that may be sent by the sensor 70 or processor 78. The solenoid 214 may receive a control signal via a hardwired signal or a wireless signal, such as an RF signal, for example.

The actuator 72 preferably is configured to hold the hammer weight 208 in an elevated position relative to the flapper valve 38 such that the flapper valve 38 is free to move between its open and closed positions during normal flush cycles. In the illustrated embodiment, after the actuator 72 has received an appropriate control signal, the solenoid 214 activates the solenoid latch 216 to release the outer hammer rod 206. As a result, the outer hammer rod 206, and thus the hammer weight 208, are released and fall downward under their own weight to forcibly close the flapper valve 38. As discussed above, the detection, processing and release of the hammer rod 206 preferably occurs before the entire flush volume of water is evacuated from the tank 16.

The actuator 72 preferably is configured to have a predetermined amount of stroke for the outer hammer rod 206 relative to the main housing 202. That is, the outer hammer rod 206 generally determines the amount of movement that the hammer weight 208 will have based on the length of the outer hammer rod 206 and the length of the main housing 202. In some embodiments, it is preferable that the hammer weight 208 will be lowered to a sufficient height so as to securely close the flapper valve 38. In the illustrated embodiment, a certain amount of telescopic adjustability is provided between the inner hammer rod 204 and the outer hammer rod 206.

With continued reference to FIG. 7, the inner hammer rod 204 preferably is insertable into the outer hammer rod 206 and telescopically adjustable so as to adjust the height of the hammer weight 208 relative to the height of the overflow tube 56. The inner hammer rod 204 preferably is securable relative to the outer hammer rod 206 by a rod collar 218 that can be tightened to secure the inner hammer rod 204 in a desired position relative the outer hammer rod 206.

Also included in the actuator 72 is a reset latch 220 that is configured to be manually lifted to reset the actuator 72 after the hammer weight 208 has been released by the solenoid latch 216. As will be appreciated by one skilled in the art, in other embodiments, the actuator 72 can be configured to automatically reset after the hammer weight 208 has been released, thus negating the need for the reset latch 220.

With reference to FIG. 8, the actuator 72 is secured to the top of the overflow tube 56 via the overflow tube attachment structure 210, which is configured to be a snap-fit in the illustrated arrangement. Furthermore, the main housing 202 of the actuator 72 preferably is positioned such that the hammer weight 208 is located generally above the flapper valve 38 such that when the hammer weight 208 is released, it will drop on the top of the flapper valve 38 and forcibly close the flapper valve 38.

With continued reference to FIG. 8, the hammer weight 208 is shown being supported in a height set jig 222 which is configured to allow a user to set the height of the hammer weight 208 relative to the outer hammer rod 206 (and the flapper valve 38). After the actuator 72 has been installed on the overflow tube 56, a user preferably loosens the rod collar 218 thus allowing the inner hammer rod 204 to move axially relative to the outer hammer rod 206. At this time it is preferable that a user place the hammer weight onto the top of the height jig 222 wherein the legs 224 of the height jig 222 are resting on the bottom of the tank 16. At this time while the hammer weight 208 is being supported by the height jig 222, a user then preferably tightens the rod collar 218 to secure the inner hammer rod 204 relative to the outer hammer rod 206 thus setting the proper height of the hammer weight 208. Before the system 10 is placed into use, the height jig 222 preferably is removed.

Although one particular embodiment of the actuator 72 has been illustrated with reference to FIG. 7 and FIG. 8, as will be appreciated by one skilled in the art, various other embodiments of actuators can be used to substantially reduce or eliminate water flow to the bowl in 18 in the event of a detected impeded flush condition. Such suitable alternative embodiments may comprise an actuator 72 that independently rests on the bottom of the tank 16 and does not attach to the overflow tube 56. Other suitable embodiments may comprise an actuator that is attached to the upper rim of the tank 16. Another suitable embodiment may comprise a rotational solenoid attached to the flapper valve 38 such that a torsional force is applied to the pivoting arm of the flapper valve 38 so as to close the flapper valve in the event of an impeded flush condition. Another embodiment may not comprise an actuator located in the tank 16 but may include an actuator that is attached a valve that controls water flow from the external water supply source 44 as illustrated in FIG. 2. Thus, the actuator 72 shown in FIG. 7 in FIG. 8 is simply one possible embodiment of an actuator that can be used with the toilet overflow prevention system 10.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while the number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with, or substituted for, one another in order to perform varying modes of the disclosed invention. Thus, it is intended that the scope of the present invention herein disclosed should not be limited by the particular disclosed embodiments described above, but should be determined only by a fair reading of the claims.

What is claimed is:

1. A toilet with overflow prevention, comprising:
a base portion comprising a bowl and a siphon tube;
a tank having an interior space that in use holds a volume of water, the tank comprising an outlet that connects the interior space with the bowl;
a flush valve that selectively permits a flow of water through the outlet from the tank to the bowl, the flush valve comprising a buoyant valve element;
an overflow prevention system comprising a sensor, a processor and an actuator, wherein the processor receives a signal from the sensor and, in response to a detected impeded condition within the bowl, controls the actuator to prevent the flow of water to the bowl through the flush valve;
wherein the actuator comprises a solenoid and a rod member controlled by the solenoid and configured to move the buoyant valve element, wherein both the solenoid and the rod member are located within the interior space of the tank and above the buoyant valve element.

2. The toilet with overflow prevention of claim 1, wherein the sensor comprises a capacitive sensing element.

3. The toilet with overflow prevention of claim 1, wherein the sensor is secured to the base portion of the toilet.

4. The toilet with overflow prevention of claim 3, wherein the sensor is located outside of the bowl and on a rear side of the bowl.

5. The toilet with overflow prevention of claim 1, wherein the actuator closes the buoyant valve element.

6. A toilet with overflow prevention, comprising:
a base portion comprising a bowl and a siphon tube;
a tank having an interior space that in use holds a volume of water, the tank comprising an outlet that connects the interior space with the bowl;
a flush valve that selectively permits a flow of the water through the outlet from the tank to the bowl, the flush valve comprising a buoyant valve element having a closed position that blocks the outlet and an open position that unblocks the outlet, wherein the buoyant valve element is configured to automatically move to the closed position once a level of the water within the tank is reduced;
an overflow prevention system comprising a capacitive sensor capable of detecting a parameter of a flush cycle caused by water dynamics within the toilet, wherein the parameter comprises a water level within the toilet, a processor that receives a signal from the sensor and processes the signal to determine if an impeded condition exists within the bowl, the overflow prevention system further comprising an actuator that at least partially controls operation of the flush valve, the actuator comprising a solenoid valve and a rod member controlled by the solenoid and figured to move the buoyant valve element, wherein both the solenoid and the rod member are located within the interior space of the tank and above the buoyant valve element;
wherein, in response to the impeded condition, the overflow prevention system utilizes the solenoid valve of the actuator to prevent opening of the flush valve.

7. The toilet with overflow prevention of claim 6, wherein the sensor is secured to the base portion of the toilet.

8. The toilet with overflow prevention of claim 7, wherein the sensor is located outside of the bowl and on a rear side of the bowl.

9. The toilet with overflow prevention of claim 6, wherein the actuator closes the buoyant valve element.

* * * * *

UNITED STATES PATENT AND TRADEMARK OFFICE
CERTIFICATE OF CORRECTION

PATENT NO. : 9,644,357 B2  
APPLICATION NO. : 13/763473  
DATED : May 9, 2017  
INVENTOR(S) : Kevin Bowcutt et al.

It is certified that error appears in the above-identified patent and that said Letters Patent is hereby corrected as shown below:

In the Claims

In Column 16 at Line 20 (approx.), In Claim 6, change "figured" to --configured--.

Signed and Sealed this  
Fifteenth Day of August, 2017

Joseph Matal  
*Performing the Functions and Duties of the*  
*Under Secretary of Commerce for Intellectual Property and*  
*Director of the United States Patent and Trademark Office*